Jan. 18, 1966  V. BOSCHET  3,229,603
ELECTROSTATIC PRINTING APPARATUS
Filed Sept. 16, 1963  3 Sheets-Sheet 1
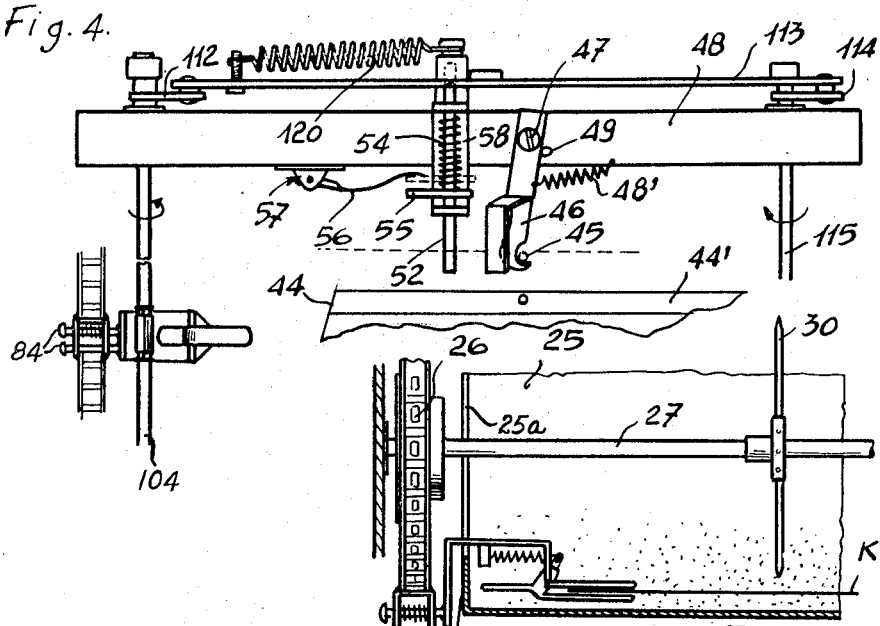
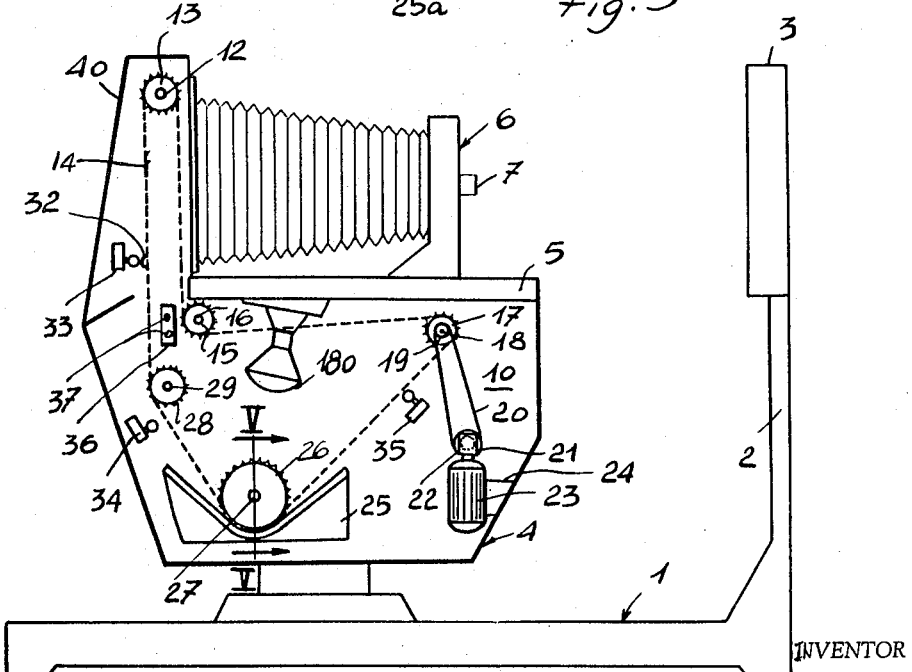
INVENTOR
Vittorio Boschet
BY
Michael J. Striker
ATTORNEY

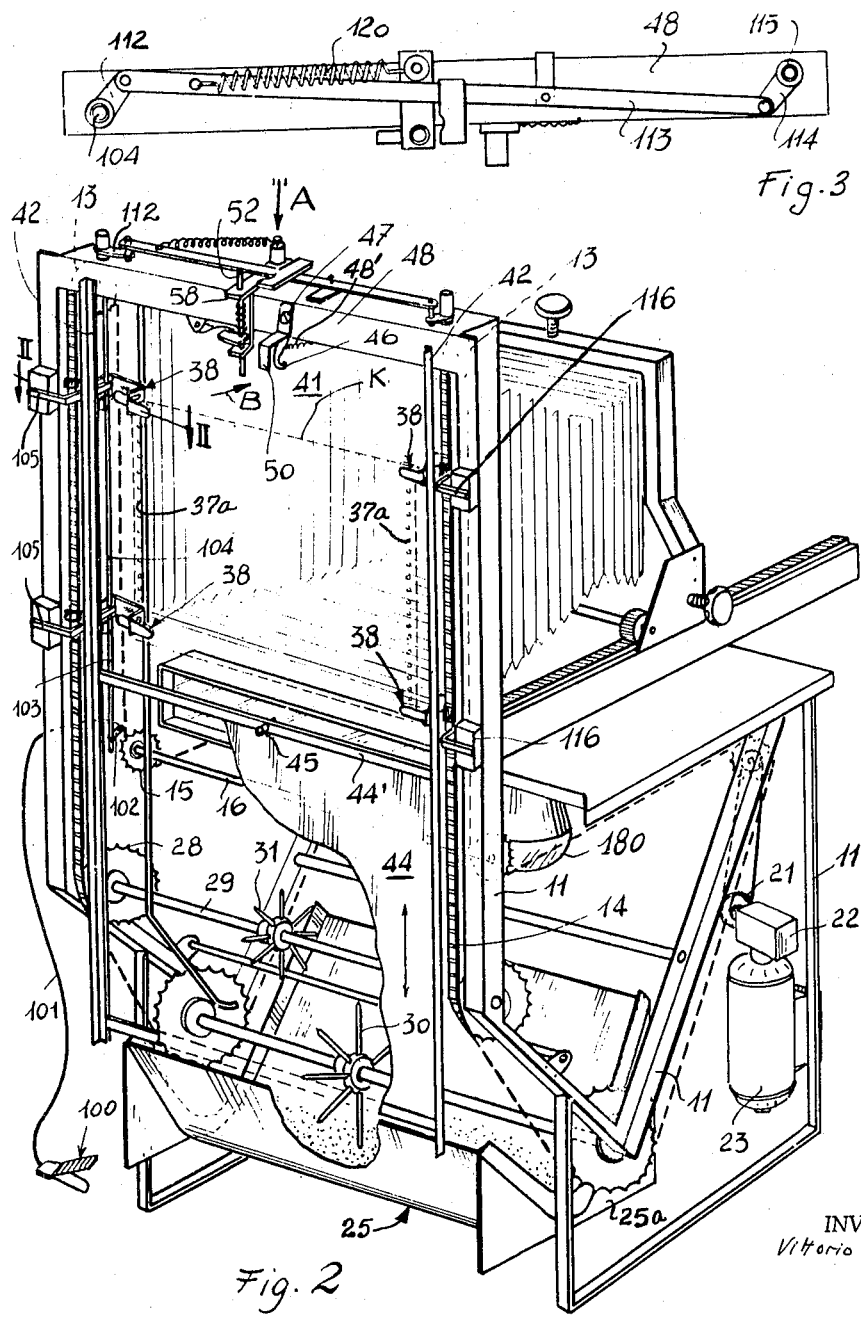

Jan. 18, 1966 V. BOSCHET 3,229,603
ELECTROSTATIC PRINTING APPARATUS
Filed Sept. 16, 1963 3 Sheets-Sheet 3

INVENTOR
Vittorio Boschet

BY
Michael S. Striker
ATTORNEY

United States Patent Office 3,229,603
Patented Jan. 18, 1966

3,229,603
ELECTROSTATIC PRINTING APPARATUS
Vittorio Boschet, Piazza Gerusalemme 4, Milan, Italy
Filed Sept. 16, 1963, Ser. No. 308,947
Claims priority, application Italy, Apr. 11, 1963,
7,475/63
9 Claims. (Cl. 95—1.7)

This invention relates to electrostatic printing apparatus, and more particularly relates to electrostatically charging the surface of a master sheet, exposing the charged surface to an optical image, and toning the resulting latent image by an electrostatic powder.

To obtain the reproduction of an image on a master sheet, the following procedure must be followed:

(a) The surface of the master sheet is electrostatically charged.

(b) The charged surface is exposed by contact with the original copy and the action of a light source, or by a camera, the master sheet acting in the latter case as a sensitised plate.

(c) The latent image is toned by electrostatic powders which are caused to adhere to all non-exposed zones of the master sheet.

(d) The master is then fused to fix the image and then utilised for printing on offset machines.

The master sheets frequently comprise aluminium or aluminium coated paper or like support, carrying a photo-electrostatic coating, or photoelectric semiconductor layer.

The above described procedure is carried out by recourse to a plurality of single units, with the result that the whole procedure is time-consuming. For example, in known apparatus the master sheet is first stretched on a frame and it is then put into a cassette and electrostatically charged. The master is then covered by an opaque plate to prevent it from being affected by light. For this purpose, the plate is inserted into guides in the frame. The frame is then inserted into the back of a camera, and the master is exposed after first having withdrawn the said plate from the guides; the plate is then re-inserted into the guides. The frame is then taken out from the camera and transferred into a further unit in which the electrostatic powder is spread onto the master, after having withdrawn the said plate. Finally, the master is dusted and fused to have the image fixed.

The above description of the current procedure clearly reveals the drawbacks caused by the complexity thereof, and which results not only in failures but a considerable loss of time.

It is an object of this invention, therefore, to provide an improved apparatus for reproducing images as electrostatically charged master sheets.

It is a further object of this invention to provide electrostatic printing apparatus for reproducing an image on a master sheet comprising a charging unit, a camera, exposure means, storage means for electrostatic powder and a conveyor for conveying the master sheet past the foregoing members in a predetermined order whereby the sheet is charged, exposed and powdered, said conveyor being electrically controlled by a circuit which effects sequential movement and arrest of said master sheet in said predetermined order.

More particularly, the camera has a tiltable back wherein the master sheet is introduced and secured to the conveyor means. The electric circuit permits the master to be moved in front of the electrostatic charging device and then brought back to its initial position where the exposure is performed, the exposed master then being conveyed through a container filled with the electrostatic powder. The latent image is thus toned by the powder and the toned master is brought once more back into its initial position, wherefrom it can be withdrawn and transferred to a fusing unit.

The invention will be better understood from a consideration of the following detailed description of one exemplified embodiment thereof, taken with the accompanying drawings. In the drawings:

FIGURE 1 is a diagrammatic view, with some parts removed, of apparatus according to the invention;

FIGURE 2 is a perspective view, with some parts removed, of FIGURE 1;

FIGURE 3 is a partial plan view in the direction of the arrow A in FIGURE 2;

FIGURE 4 is a front elevation, with some parts shown as a perspective view, of a detail of the upper section of the apparatus, as viewed in the direction of the arrow B in FIGURE 2;

FIGURE 5 is a cross-sectional view, taken on the line V—V of FIGURE 1;

Figure 6:
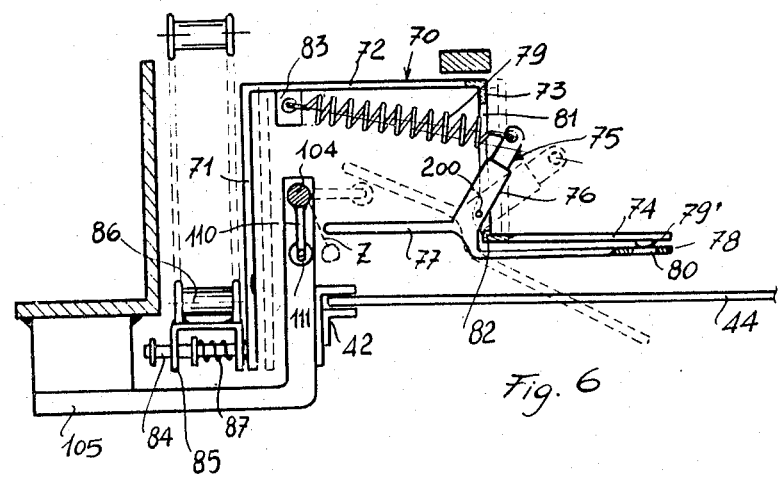
FIGURE 6 is a cross-sectional view, taken on the line VI—VI of FIGURE 2.

Referring now to the above figures, and more particularly to FIGURES 1 and 2 of the drawing, the apparatus consists of a base 1 carrying a post 2 on the upper end of which a frame 3 is supported, the original copy being positioned on this frame. A further frame 4 is also carried by the base 1 and is provided with guides 5 on which the bellows-type camera 6 is slidingly fitted. The camera has an optical system 7 and can be locked in any required position.

A chamber 10 extends from the back and below the camera. This chamber is light-proofed by means of panels and packings, not shown, which are fastened in a known manner to the structure 4 and the framework of which, as shown in FIGURE 2, consists of a number of section or angle irons, inter-connected, e.g. by welding, to one another.

A shaft 12 is fitted inside the chamber 10, near the back of the camera. The latter shaft is mounted in bearings (not shown) carried on both sides of said structure 4. Sprocket wheels 13 are keyed near both outer ends of said shaft and are designed to serve as a guide for chains 14. These chains are back-geared under the guides 5 by a pair of sprocket wheels 15, which are splined on a shaft 16, and also supported between the sides of the apparatus. Both chains are then driven over a further pair of sprocket wheels 17 splined on a shaft 18. A pulley 19 is also keyed on this shaft and is driven through a belt transmission 20 by a pulley 21 keyed on to the outlet shaft of a speed reduction gear, the gear being powered by a reversible electric motor 23. This motor is supported by an arm 24 which is secured to the frame of the apparatus.

The chains 14 enter a container 25, wherein the electrostatic powder is contained. This container is V-shaped and laterally defined by side walls 25a. A pair of back-gearing sprocket wheels 26 are splined on a common shaft 27, extending across the sides of the apparatus, and ensure that the master sheet K penetrates into the powder contained in the container 25. The chains then follow a vertical path over a pair of sprocket wheels 28 splined on a common shaft 29 which also extends across the sides of the apparatus.

To prevent possible bulging of the master sheet during transportation thereof about the bends of the transportation path, positioning spiders 30 and 31 are mounted on the shafts 27 and 29 respectively; these positioning spiders engage the inner surface of the master sheet during transportation preventing bulging thereof and maintaining it in the transportation plane.

A cam 32 is secured to the chain at a pre-established point thereof and is designed to cooperate, while the chain is running, with a row of micro-switches 33, 34 and 35, fitted at different points along the chain path.

Leads 37 are connected to a source of potential and are fitted on a U-shaped supporting member 36. These leads are designed to charge electrostatically the master sheet K which, as described hereinafter, is kept stretched between clamps 38 connected to the chains.

The master sheet K is introduced and withdrawn through a window 41 formed on the rear side 40 of the apparatus. This window is laterally de-limited by vertical guides 42, parallel with one another, and on which a shutter 44 is sliding fitted. The handle 45 of this shutter can be engaged, when in closed position, with a hook 46 which is pivotally connected at 47 with an upper cross member 48 of the machine frame. This hook is urged into contact with a stop 49, which is fitted on the same cross-member 48, under the action of a tension spring 48' (see FIG. 4). An elbow plate 50 jutting out from the front face of the hook 46 is acted upon by the operator, when the shutter 44 is to be unhooked, to obtain access to the master sheet K.

When the shutter 44 is in its closed position (see FIGURE 4), the upper edge 44' thereof is urged against a rod 52 which can be vertically shifted against the action of a spring 54 and by which the control lever 56 of a switching device 57 is acted upon through a plate 55 mounted on said rod. The rod 52 is guided by a support 58 which is secured to the cross member 48.

To keep the master sheet K stretched between the chains, four clamps 38 are provided. Two of these clamps are carried at different levels by one of the chains while the remaining two clamps are carried by the other chain. However, more than four clamps—e.g. six or eight clamps—may be provided when required, in dependence on the size of the master sheet.

Such clamps comprise (see FIGURES 5 and 6) a rigid jaw or portion 70, consisting of four sides 71, 72, 73 and 74, located at right-angles with one another, and a swivelling jaw or portion 75 hinged at 200 to the rigid portion. This swivelling portion comprises three arms 76, 77 and 78. The arm 78 is urged into contact with the side 74 of the rigid portion by a tension spring 79 secured at a perforated limb 8 on the end of arm 76. A nose 79', formed on the end of side 74, is designed to engage with one of the holes 37a in the master sheet K and with a hole 80 formed at a suitable position on the arm 78. The master sheet may alternatively not be perforated and in such a case the nose 79' may be omitted. The arm 76 extends through a slot 81 in the side 73 of the rigid portion. The spring 79 is hooked on to a perforated limb 83 which is secured on the inner face of side 72. Two pins 84, parallely secured on the end of side 71 of the rigid portion of the clamps located on the left side of FIGURE 2, extend through a stirrup 85, which is secured to a chain link 86. A spring 87 is fitted on one of these pins and tends to keep the clamp in the position as shown by the solid lines in FIGURE 6, while allowing, at the same time, a small shift toward the position by the broken lines in this figure. The two clamps 38 located on the right side of FIGURE 2 are however rigidly and directly connected to the stirrup 85, and thus with the related chain.

To operate said clamps (see FIG. 2), a foot lever 100 is depressed. This foot lever is connected by a cable 101 with an arm 102, extending from the lower end of a vertical rod 104, which is rotatably supported by a pair of square brackets 105 fastened at different levels to one of the sides of the apparatus.

The vertical rod 104 (see FIG. 6) is provided with two arms 110, having a roller 111 mounted on their outer ends, and facing the two clamps on the left-hand side. When at rest, the upper arm takes up the position as shown by the solid lines, while the lower arm takes the position Z, with the result that the lower clamp is opened before the upper one, and closed after the closing of the lower clamp.

An arm 112 is fitted on the end of the rod 104 which extends from the upper cross member 48 (see FIGURES 2, 3 and 4). This arm is connected, by means of a connecting rod 113, with an arm 114, which is secured to a vertical rod 115, similar to the rod 104. A crossed articulated parallelogram is formed by the arms 112 and 114 and by the connecting rod 113. The rod 115 is supported, like the rod 104, by two square brackets 116, which are wholly similar to those shown in FIGURE 6, and marked 105. The rod 115 is also provided with arms similar to arms 110 and Z, and by which the two right hand clamps 38 are operated. As can be readily appreciated, when the foot lever 100 is depressed, all the four clamps 38 will be opened, and when the foot lever is left free, the spring 120, which is fitted between the cross member 48 and the connecting rod 113, will automatically cause the clamps 38 to close.

The operation of the apparatus will now be described with particular reference to FIGURE 7.

First of all, the master sheet K is inserted through the window 41, and secured to the chains by means of clamps 38. The subsequent closing of the shutter 44 will bring the switching device 57 into the position shown in solid lines in FIGURE 7. The apparatus is then connected with the source of electric power by means of a manually operated switch 150, and a pushbutton 151 is depressed by the operator, whereby:

(a) A relay 152 is energised.
(b) A timer 153 is started.
(c) A high voltage transformer 154 is switched on, thus feeding the required potential to leads 37 through a known circuit.
(d) The reversible motor 23 is started by means of a normally closed contact 155 of the relay 156.

The chains are thus moved, whereby the cam 32 is drawn away from the micro-switch 33. In consequence thereof, the movable contact of said micro-switch 33 is shifted into the position shown by the broken lines which hold the relay 152 energised to supply the leads 37 and keep the motor 23 in operation after the starting pushbutton 151 has been released. Both operating contacts 160, 161 of the relay 152 are closed, the relay 152 acting as a holding relay and being kept energised through its own contact 160, and the energising circuit of relay 156 being "primed" through contact 161. Moreover, the motor 23 is kept operating by means of the normally closed contact 155 of the latter relay 156. When the cam 32 is brought into engagement with the micro-switch 34, the relay 156 is energised, whereby the normally closed contact 155 is opened, and the normally open contact 163 is closed, which results in a reversal of the direction of rotation of motor 23; thus, the master sheet is passed again in front of charging unit leads 37, and is brought back on to the focal axis of the camera 6. The then closed contact 164 will keep the relay 156 energised. When the cam 32 again engages with the microswitch 33, this switch is moved back into the position shown by the solid lines in FIGURE 7, thus causing the relays 152 and 156 to be de-energised, while the motor 23 is stopped. The timer 153 is calibrated in such a manner as to be kept switched on for a further few seconds after the master sheet has been brought back to its initial position, and is arranged to cause the two position contact 170, connected thereto whereby an impulse is sent to timer 171, thus controlling the exposure time. The same impulse, resulting from movement of switch 170 causes relay 173 to become energised, whereby the normally open contacts 174 and 175 are closed. The closing of contact 174 results in the lighting of lamps 176, by which the original copy, fitted on the frame 3, is illuminated, while the contact 175 is arranged to keep the relay 173 energised even after the contact 170 has been brought back into the position shown in FIGURE 7.

Figure 7:
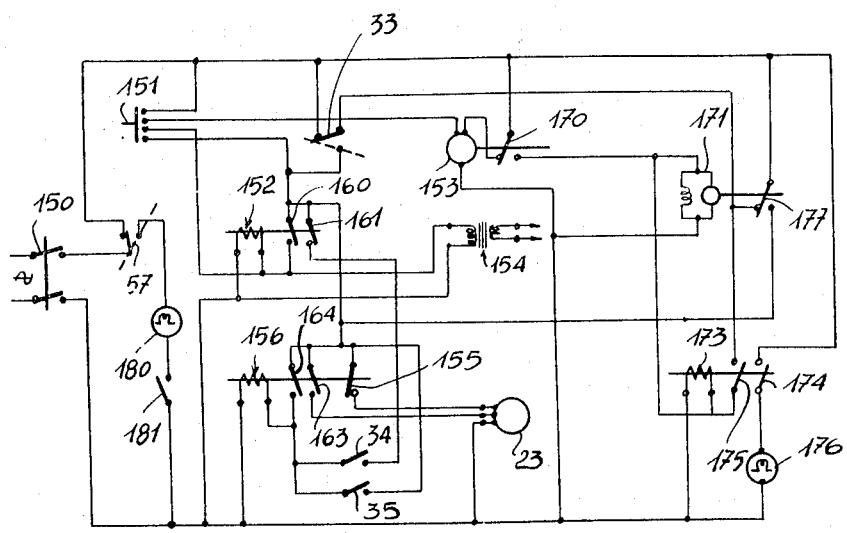
FIGURE 7 is the wiring diagram of a control circuit.

At the end of the time to which the exposure timer 171 has been adjusted, the two position contact 177 of said timer 171 is momentarily switched from the position shown in FIG. 7 to its other position whereby the circuit by which the motor 23 is fed is closed through the normally closed contact 155. In consequence thereof, the master sheet K is moved downward, and is caused to pass through the tray 25 in which the electrostatic powder is contained. This master sheet can be kept moving because the disengagement of cam 32 from the micro-switch 33 once more shifts the movable contact of the latter to the broken line position thereof in FIG. 7 which allows the motor 23 to be fed through the normally closed contact 155. After the master sheet has passed the tray 25, a circuit is established by which the relay 156 is energised when the cam 32 comes into contact with the end-stroke micro-switch 35. At this time, the relay 156 is energised, thus causing the reversal of direction of rotation of the motor 23 in the manner previously described, whereby the master sheet is brought back into its initial position, the contact 33 then being switched back into the position shown in FIGURE 7, whereby the motor 23 is stopped and the relay 156 de-energised.

It is to be noted that, at the end of the exposure time, controlled by the timer 171, the micro-switch 33, operated by the motion of the master sheet, results also in the de-energisation of relay 173, and in the lamps 176 being extinguished.

Finally, the master sheet K is withdrawn by lowering the shutter 44 and by depressing the foot lever 100. However, the opening of shutter 44 will shift the micro-switch 57 into the position shown by the broken lines in FIGURE 7. In consequence thereof, a circuit is established which comprises infra-red heating lamps 180, and a contact 181 of an hydrometer, whereon the humidity degree present in the chamber 10 can be read, the contact 181 being closed when a predetermined value of humidity is exceeded. Such a circuit is necessary to prevent possible agglomeration of the electrostatic powder contained in the container 25, as an effect of the ambient moisture.

If steps are not taken to decrease humidity, such agglomeration would cause a faulty or inaccurate reproduction of the image on the master sheet. Moreover, owing to the absorbed moisture, the powder would tend to adhere on the unexposed portion of the master sheet.

From the preceding description, it will be apparent that apparatus according to the invention results in a quick, simple and reliable manner of effecting electrophotography, in particular since it allows reproductions as required, the apparatus automatically performing the different operating steps and delivering the master sheet ready to be submitted to the fusing step, or fixing, of the toned image.

I claim:
1. In electrostatic printing apparatus for reproducing an image on a master sheet,
a housing,
movable endless sheet-conveyor chains mounted in said housing,
clamping means on said chains for securing said sheet thereto,
a frame in said housing defining a window aligned with said chains,
a closure member slidingly fitted on said frame and movable between a first position in which said window is closed and a second position in which said window is opened for permitting the passage therethrough of said sheet for securing the sheet to the clamping means,
electrical means for electrostatically charging said sheet,
a camera for exposing an image on said sheet,
storage means for storing electrostatic powder, said electrical means, said camera and said storage means being located adjacent said conveyor chains,
contact means actuated by said closure member when said member is in said second position,
electrical heating means located adjacent said storage means and operated by said contact means for decreasing the moisture content of said electrostatic powder,
an electric motor for driving said conveyor chains, and
circuit means for controlling said motor sequentially to convey said sheet to, and arrest said sheets at, said electrical means, said camera and said storage means whereby said sheet is charged, exposed and powdered in succession.

2. In electrostatic printing apparatus for reproducing an image on a master sheet,
a housing,
movable endless sheet-conveyor chains mounted in said housing,
clamping means on said chains for securing said sheet thereto,
a frame in said housing defining a window aligned with said chains,
a closure member slidingly fitted on said frame and movable between a first position in which said window is closed and a second position in which said window is opened for permitting the passage therethrough of said sheet for securing the sheet to the clamping means,
an electric motor having a driving shaft, coupling means interconnecting said driving shaft and said sheet-conveyor chains,
electrical means for electrostatically charging said sheet,
a camera for exposing an image on said sheet, storage means for storing electrostatic powder, said electrical means, camera and said storage means being located at spaced positions adjacent said conveyor chain,
contact means, said contact means being actuated by said closure member when said member is in said second position,
electrical heating means located adjacent said storage means, said heating means being operated by said contact means for decreasing the moisture content of said electrostatic powder,
cam means connected to said conveyor chain,
electro-mechanical circuit means for controlling said motor, said circuit means comprising
a plurality of switching means located at spaced positions adjacent the conveyor chain and operable by said cam means during the movement of said chain, and
a timer connected to and operable in response to, said switching means for governing the duration for which said sheet is exposed, said circuit means controlling said motor for driving said conveyor chains sequentially to convey said sheet to said electrical means, said camera and said storage means whereby said sheet is charged, exposed and powdered in succession.

3. In an electrostatic printing apparatus for reproducing a projected image on a master sheet comprising, in combination, a housing; projection means having an optical axis extending in a predetermined direction and having a projection plane arranged within said housing normal to said optical axis of said projection means; transporting means located in said housing for transporting a master sheet along a path including a projection path portion located in said projection plane, an electrostatic charging path portion and a powder path portion, said transporting means being constructed and arranged in such a manner that said path extends partly in said projection plane and partly in a direction transversal thereto, located on the same side of said projection plane as said projection means and extending in the region adjacent thereto; electrostatic charging means arranged within said housing along said electrostatic charging path portion; and powder applying means arranged within said casing in said powder path portion.

4. In an electrostatic printing apparatus for reproducing a projected image on a master sheet comprising, in combination, a housing; projection means having an optical axis extending in a predetermined direction and having a projection plane arranged within said housing normal to said optical axis of said projection means; transporting means located in said housing for transporting a master sheet along a path including a projection path portion located in said projection plane, an electrostatic charging path portion and a powder path portion, said transporting means being constructed and arranged in such a manner that said path extends partly in said projection plane and partly in a direction transversal thereto, located on the same side of said projection plane as said projection means and extending in the region adjacent thereto and having, in the direction of said optical axis, a maximum extension which is not greater than the dimension of said projection means in the same direction; electrostatic charging means arranged within said housing along said electrostatic charging path portion; and powder applying means arranged within said housing in said powder path portion.

5. In an electrostatic printing apparatus for reproducing a projected image on a master sheet comprising, in combination, a housing; projection means having an optical axis extending in a predetermined direction and having a projection plane arranged within said housing normal to said optical axis of said projection means; transporting means located in said housing for transporting a master sheet along a path including a projection path portion located in said projection plane, an electrostatic charging path portion and a powder path portion, said transporting means being constructed and arranged in such a manner that said path extends partly in said projection plane and partly in a direction transversal thereto, located on the same side of said projection plane as said projection means and extending in the region adjacent thereto and having, in the direction of said optical axis, a maximum extension which is not greater than the dimension of said projection means in the same direction, said projection path portion of said transporting means being substantially coextensive in the projection plane with the outline of said projection means and said path extending substantially beyond said outline of said projection means in said plane in only one direction normal to said optical axis; electrostatic charging means arranged within said housing along said electrostatic charging path portion; and powder applying means arranged within said housing in said powder path portion.

6. In an electrostatic printing apparatus as set forth in claim 5, wherein said optical axis is substantially horizontal and said electrostatic charging path portion and said powder path portion are all located below said optical axis.

7. In an electrostatic printing apparatus as set forth in claim 6, wherein said powder path portion is substantially V-shaped and diverges upwardly in the direction of said projection means.

8. In an electrostatic printing apparatus as set forth in claim 3, wherein said housing has a first portion and a second portion extending transverse to said first portion so as to constitute an L-shaped housing, said projection means being located in the space between and bounded by said portions of said L-shaped housing.

9. In an electrostatic printing apparatus as set forth in claim 8, wherein said optical axis is substantially parallel to the extension of one of said portions of said L-shaped housing and normal to the extension of the other of said portions.

References Cited by the Examiner
UNITED STATES PATENTS

| | | | |
|---|---|---|---|
| 2,221,776 | 11/1940 | Carlson | 95—1.7 X |
| 3,083,622 | 4/1963 | Keller et al. | 95—1.7 |
| 3,099,856 | 8/1963 | Eichorn et al. | 95—1.7 X |

EVON C. BLUNK, *Primary Examiner.*